United States Patent
Shaw et al.

(10) Patent No.: US 10,482,791 B2
(45) Date of Patent: Nov. 19, 2019

(54) SINGLE USE MANNEQUIN HAVING CHEST COMPRESSION FEEDBACK MECHANISM FOR USE IN SIMULATED CARDIOPULMONARY RESUSCITATION (CPR) TRAINING

(71) Applicant: Protrainings, LLC, Grand Rapids, MI (US)

(72) Inventors: Roy W. Shaw, Rockford, MI (US); Jody D. Marvin, Belding, MI (US)

(73) Assignee: ProTrainings, LLC, Ada, MI (US)

(*) Notice: Subject to any disclaimer, the term of this patent is extended or adjusted under 35 U.S.C. 154(b) by 995 days.

(21) Appl. No.: 14/986,577

(22) Filed: Dec. 31, 2015

(65) Prior Publication Data

US 2017/0193857 A1 Jul. 6, 2017

(51) Int. Cl.
*G09B 23/28* (2006.01)
(52) U.S. Cl.
CPC .................. *G09B 23/288* (2013.01)
(58) Field of Classification Search
CPC .................................................. G09B 23/288
USPC ............................................................. 434/265
See application file for complete search history.

(56) References Cited

U.S. PATENT DOCUMENTS

| 4,611,998 A * | 9/1986 | Ramamurthy | G09B 23/288 434/265 |
| 5,312,259 A * | 5/1994 | Flynn | G09B 23/288 434/265 |
| 5,423,685 A * | 6/1995 | Adamson | G09B 23/288 434/265 |
| 6,273,728 B1 * | 8/2001 | van Meurs | G09B 23/28 434/262 |
| 6,530,783 B1 * | 3/2003 | McGinnis | G09B 23/288 434/262 |
| 9,486,390 B2 * | 11/2016 | Centen | A61H 31/005 |
| 2005/0058977 A1 * | 3/2005 | Cantrell | G09B 23/288 434/350 |
| 2007/0105082 A1 * | 5/2007 | Laerdal | G09B 23/288 434/265 |
| 2008/0145827 A1 * | 6/2008 | Strand | G09B 23/288 434/265 |
| 2008/0171311 A1 * | 7/2008 | Centen | G09B 23/288 434/265 |
| 2010/0021876 A1 * | 1/2010 | Clash | G09B 23/288 434/265 |
| 2010/0022904 A1 * | 1/2010 | Centen | A61H 31/005 600/534 |

(Continued)

OTHER PUBLICATIONS

Protrainings, LLC Web site Publication; "What do Sumo wrestlers, cardboard boxes, and CPR training have in common"? pp. 1.

*Primary Examiner* — John E Simms, Jr.
*Assistant Examiner* — Dolores R Collins
(74) *Attorney, Agent, or Firm* — Frank M. Scutch, III

(57) ABSTRACT

A mannequin (200) including a chest compression feedback mechanism for use in simulated cardiopulmonary resuscitation (CPR) training includes a box (203) for simulating a human chest such that a head (201) is connected to one side of the box (203). A mechanical noise generator (215) is positioned within the box (203) for making an audible sound when force is applied to a predetermined area of the box during simulated chest compressions. This sound indicates to the teacher and/or student that a required compression depth has been met during CPR training.

11 Claims, 4 Drawing Sheets

(56) References Cited

U.S. PATENT DOCUMENTS

| | | | | |
|---|---|---|---|---|
| 2010/0234908 A1* | 9/2010 | Didon | ................... | A61N 1/39 |
| | | | | 607/5 |
| 2010/0291522 A1* | 11/2010 | Cook | ................... | G09B 23/28 |
| | | | | 434/265 |
| 2012/0329022 A1* | 12/2012 | Hetland | ............... | G09B 23/288 |
| | | | | 434/265 |
| 2014/0057235 A1* | 2/2014 | Kellum | ................ | G09B 23/288 |
| | | | | 434/265 |
| 2014/0154656 A1* | 6/2014 | Segall | ................ | G09B 23/285 |
| | | | | 434/265 |
| 2015/0004584 A1* | 1/2015 | Galibois | ............... | G09B 23/30 |
| | | | | 434/270 |
| 2015/0079567 A1* | 3/2015 | Mansi | ................. | G09B 23/288 |
| | | | | 434/265 |
| 2015/0125840 A1* | 5/2015 | Pastrick | .............. | G09B 23/288 |
| | | | | 434/265 |
| 2017/0193857 A1* | 7/2017 | Shaw | .................. | G09B 23/288 |

* cited by examiner

SINGLE USE MANNEQUIN HAVING CHEST COMPRESSION FEEDBACK MECHANISM FOR USE IN SIMULATED CARDIOPULMONARY RESUSCITATION (CPR) TRAINING

FIELD OF THE INVENTION

The present invention relates generally to cardiopulmonary resuscitation (CPR) and more particularly to a mannequin used in CPR training.

BACKGROUND

CPR is an emergency lifesaving procedure that is done when a person's breathing or heartbeat has stopped. A person's breathing or heartbeat may stop after an electric shock, a heart attack, or drowning. CPR combines both rescue breathing and chest compressions to resuscitate a person in such medical distress. Under newly issued American Heart Association (AHA) 2015 guidelines, in order to achieve effective chest compressions, rescuers should compress at least one third of the anteroposterior diameter of an infant's or child's chest. This corresponds to approximately 1.5 inches (about 4 cm) in most infants and about 2 inches (5 cm) in most children.

If CPR is done incorrectly, resuscitation has a much lesser chance of success. Similarly, at least one adult study has suggested some harm with chest compressions deeper than 2.4 inches (6 cm). This has resulted in a change in the adult basic life support (BLS) recommendations to include an upper limit for chest compression depth. The most current 2015 guideline recommendation is to compress at a depth of 2-2.4 inches deep.

Medical simulation mannequins, models or related artifacts are widely used in medical education. These are sometimes also referred to as virtual patients. The term "manikin" can refer exclusively to these types of models, however the spelling "mannequin" is also often used. In medical training, mannequins may be commonly used to demonstrate methods of giving first aid such as CPR. Fire and coastguard services use mannequins to practice lifesaving procedures. The mannequins have similar weight distribution to a human and allow the trainee to benefit by simulating a more lifelike experience.

FIG. 1 is a prior art diagram of a single use mannequin 100 that includes a mannequin head 101 that is held in position using a box 103. A plastic bag is positioned through the head and within the box 103 and works by allowing a visible chest rise and fall on the mannequin when air blown in the mannequin's mouth 107 during CPR training.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
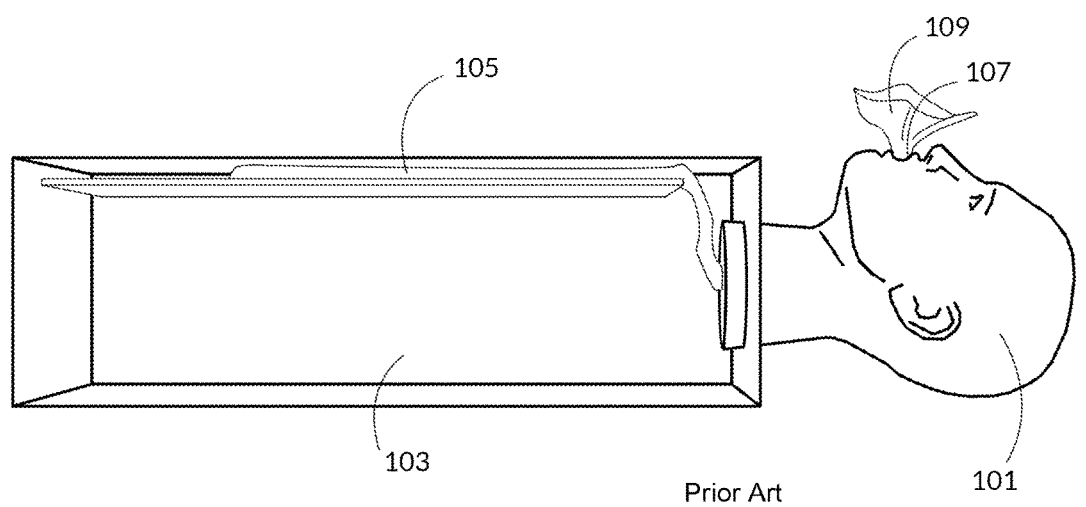
FIG. 1 is a prior art diagram illustrating a single use mannequin.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a single use mannequin having chest compression feedback. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

When teaching CPR, those skilled in the art will recognize that a good feel for the proper compression depth is very difficult without extensive practice. This becomes even more problematic especially in an emergency situation or at a patient's bedside. The use of a feedback device for training helps to teach the chest compression force required for meeting AHA guidelines. During training, it is the AHA's expectation that rescuers provide chest compressions that depress the chest at least one third the anteroposterior diameter of the chest in pediatric patients i.e. infants and children up to the onset of puberty. Children younger than one year have separate guidelines. In general, these chest compressions will be approximately 1.5 inches (4 cm) in infants to 2 inches (5 cm) in children. Once children have reached puberty (i.e., adolescents), the recommended adult compression depth of at least 2 inches (5 cm) but no greater than 2.4 inches (6 cm) is recommended.

Figure 2:
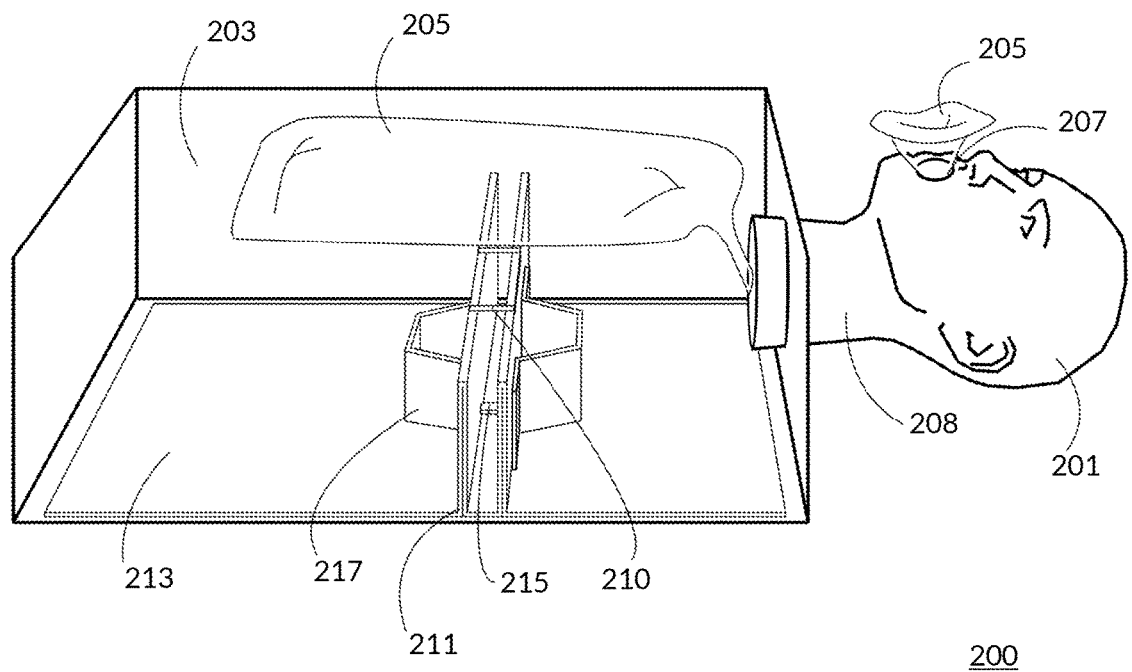
FIG. 2 is a diagram showing a single use mannequin having compression depth feedback in accordance with some embodiments of the invention.

FIG. 2 is a diagram showing a single use mannequin utilizing compression depth feedback in accordance with an embodiment of the invention. The single use mannequin 200 includes a head 201 that is positioned at one end on a top side of box 203. The box 203 is typically a single or double thickness cardboard box, rectangular in shape that simulates the shape of a person's torso. The box can flattened and reassembled for easy shipping. The head 201 uses a plastic bag 205 that is positioned through the mouth and is configured within the box so that it works to simulate a person's lungs during CPR. A hole within a wall of the box 203, positioned below head 201, supports the head 201 while also allowing the plastic bag 205 to be routed through the mannequin's neck 208 and out the mouth which is configured as a hole below the nose.

Within the box 203, a first bridge 209 and second bridge 211 are comprised of a plurality of substantially rectangular shaped cardboard sections that extend on their edge orthogonally from the floor 213 of box 203. The first bridge 209 and second bridge 211 are used in connection with a mechanical noise generator, such as a clicker 215. The clicker 215 is positioned under or below both the first bridge 209 and second bridge 211. When pressure is applied to the upper, substantially flat, surface of the box 203, the first bridge 209 and second bridge 211 move and flex downwardly to actuate the clicker 215 so that it makes a noise or sound. This sound can be heard by both the teacher and student during CPR training allowing them to know that the required chest compression depth has been achieved. Those skilled in the art the clicker 215 can be shaped in manner so it can be more easily actuated by the first bridge 209 and second bridge 211 or alternatively a plurality of clickers can be used at predetermined positions under the first bridge 209 and second bridge 211. If a plurality of clickers were used, they can be configured to produce different types of electrical or mechanical noises so that the teacher or student can vary force or hand position during chest compressions.

The first bridge 209 and the second bridge 211 are connected using one or more rubber band(s) 210. The rubber band 210 is located at the distal end of the first bridge 209 and second bridge 211 closest to the upper surface of box 203. The rubber band 210 provides a resilience between these structures so that are pulled back into a static position after the student or teaches provides compressions to the box. The first bridge 209 and second bridge 211 are each individually supported using a plurality of support walls 217 that form a three sided substantially U-shape. The open end of each U connects to the side of each of the first bridge 209 and second bridge 211 to support the bridge along its edge against the floor 213.

Figure 3:
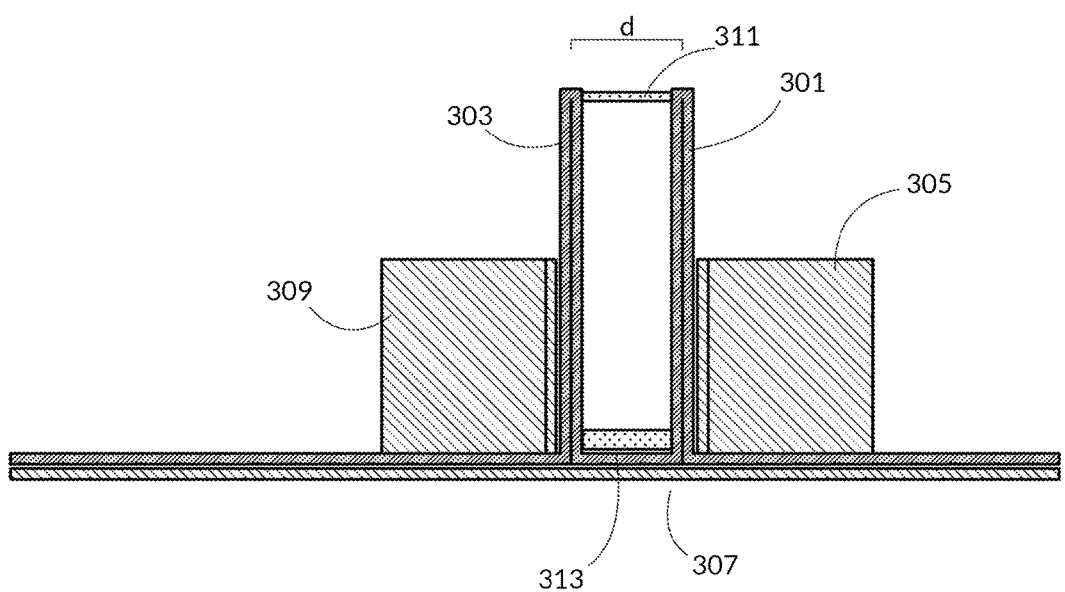
FIG. 3 is a cross-sectional diagram of the compression depth feedback mechanism shown in FIG. 2.

FIG. 3 is a cross-sectional diagram of the compression depth feedback mechanism shown in FIG. 2. The compression depth feedback mechanism 300 shows the first bridge 301 and second bridge 303. The first bridge 301 utilizes a support wall 305 extending therefrom to maintain a substantially vertical orientation in relation to the floor 307. Similarly, the second bridge 303 utilizes a support wall 309 for also holding it into a substantially vertical position in relation to the box floor. Both of the first bridge 301 and second bridge 303 are separated by a predetermined distance (d) and are joined using one or more resilient members such as rubber bands 311. The rubber bands 311 allow the first bridge 301 and second bridge 303 to flex and move apart when a compressive force is applied to the surface of the box. A clicker 313 is positioned between the first bridge 301 and second bridge 303 on the floor 307 of the box in order to provide a clicking noise when compressed, allowing the teacher and student to know when a predetermined CPR compression depth has been reached.

Figure 4:
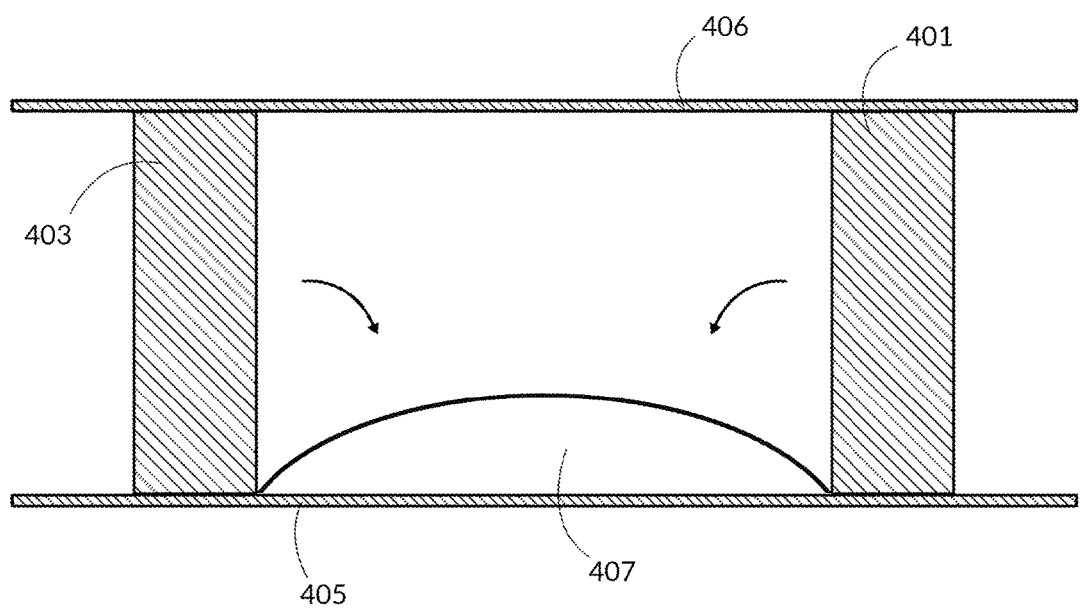
FIG. 4 is a cross-sectional diagram of the clicker used in the compression depth feedback mechanism shown in FIG. 3.

FIG. 4 is a cross-sectional diagram of the clicker used in compression depth feedback mechanism shown in FIG. 3. The compression depth feedback mechanism 400 includes the first bridge 401 and second bridge 403 are positioned substantially orthogonally to the floor 405 of the box. The top 406 of the box is generally positioned against the tops of the first bridge 401 and second bridge 403. The clicker 407 is shown positioned between the first bridge 401 and second bridge 403 such that compression of either the first bridge 401 or second bridge 403 will flex the clicker 407 downwardly. The type of clicker 407 is selected so the force applied by the first bridge 401 and second bridge 403 can easily actuate the clicking type noise for alerting the teacher and student that the CPR compression depth is correct.

Similarly, a method for providing chest compression feedback using a mannequin during cardio-pulmonary resuscitation (CPR) training includes the step of simulating a human torso using a box; positioning at least one bridge within the box such that it extends substantially orthogonally from a floor of the box. A mechanical noise generator is positioned adjacent to the at least one bridge where the mechanical noise generator is actuated using a compressive force applied to a top surface of the box such that the compressive force moves the at least one bridge. Finally, adequate chest compression can then be determined during CPR training by hearing a click of a mechanical noise generator. In order to configure the box to provide a clicking sound or audible noise, two bridges are formed from the at least one bridge and joining the two bridges using at least one rubber band. The two bridges are supported using support walls that contact a floor of the box. The support walls are formed into a substantially U-shape. A head is connected to a top portion of the box and a plastic bag located within the box and connect to the mouth on the head simulates a person's lungs.

Thus, the present invention is directed to a mannequin used in CPR training having a feedback mechanism for indicating to the teacher and/or student that a correct chest compression depth has been achieved. The feedback mechanism includes a plurality of bridges that extend orthogonally from the floor of the box. The bridges are joined by resistant members such as rubber bands for allowing the bridges to actuate a clicker device positioned between the bridges. Thus, when the student provides a compressive force to the surface of the box, the bridges push the clicker in a downward manner to create a noise such as a clicking sound.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A mannequin having a chest compression feedback mechanism for use in simulated cardiopulmonary resuscitation (CPR) training comprising: a box for simulating a human chest; a head having a mouth and connected to one side of the box; a plastic bag configured over and through the mouth and head, and extending into the box fastened to the top of the box so the user can give breaths to produce visible chest rise and fall movement; a mechanical noise generator positioned within the box for making an audible sound where the mechanical noise generator includes a first bridge and second bridge configured substantially orthogonally to a top of the box and supported by a bottom of the box such that a clicker is positioned there between, where force is applied to a predetermined area of the top of the box moves a joining bridge up and down between the first and second bridge to actuate the clicker during chest compressions for indicating required compression depth and effective chest compressions during CPR training; and wherein a resilient band returns the third bridge back up to its original position for simulating chest recoil.

2. A mannequin as in claim 1, wherein the first bridge and second bridge are connecting using at least one rubber band.

3. A mannequin as in claim 1, wherein the first bridge and second bridge each include a support for maintaining the bridge in a fixed position.

4. A mannequin as in claim 3, wherein the support includes a plurality walls for proving a supporting surface against a bottom of the box.

5. A mannequin as in claim 4, wherein the first bridge and second bridge each include a plurality of walls that connect to a side of the first bridge and second bridge.

6. A mannequin for use in cardio-pulmonary resuscitation (CPR) training comprising: a substantially square box for simulating a human torso; a head having a hole bored through the mouth and neck where the head is connected to the box and where a bag extends through the mouth, through the head and into the box, and attaches to a top positioned in the box, so the user can give breaths that produce visible chest rise and fall movement; a plurality of bridges each joined together with a resilient band and positioned within the box extending substantially orthogonally from a floor of the box; a mechanical noise generator positioned between the plurality of bridges; and wherein a compressive force applied to a top surface of the box moves a joining bridge attached to the top of the box to actuate the mechanical noise generator for producing a click indicating an adequate chest compression depth during CPR training.

7. A mannequin as in claim 6, wherein the plurality of bridges are each supported using walls contacting a floor of the box.

8. A mannequin as in claim 7, wherein the support walls are U-shaped.

9. A mannequin as in claim 6, wherein the box is made of cardboard.

10. A method for providing chest compression feedback using a mannequin during cardio-pulmonary resuscitation (CPR) training comprising the steps of: simulating a human torso using a box; joining a head to a side of the box; configuring a plastic bag over a mouth, through the head into the box so the user can give breaths that produce visible chest rise and fall movement; positioning at least two bridges within the box such that the bridges extend substantially orthogonally from a floor of the box and are joined to one another using a resilient band; supporting the two bridges using a plurality of support walls extending from the floor of the box; positioning a mechanical noise generator adjacent to the at least one bridge; actuating the mechanical noise generator using a compressive force applied to a top surface of the box such that the compressive force plunges a joining bridge downwardly, that is connected to the top of the box, in-between the first and second bridges; and determining an adequate chest compression during CPR training by hearing a click of a mechanical noise generator as it is depressed at a predetermined distance by the joining bridge whereas the resilient band returns the joining bridge back up to its original position simulating full chest recoil.

11. The method of claim 10, further comprising the step of: forming the support walls into a substantially U-shape.

* * * * *